Jan. 24, 1956 J. H. MacNEILL 2,732,275

MAGNETIC RECORDING HEAD

Filed Dec. 28, 1954

INVENTOR.
JOHN H. MAC NEILL
BY James S. Shannon
AGENT
and
Wade Koontz
ATTORNEY 2,732,275

MAGNETIC RECORDING HEAD

John H. MacNeill, Melbourne, Fla., assignor to the United States of America as represented by the Secretary of the Air Force Application December 28, 1954, Serial No. 478,214

7 Claims. (Cl. 346—74)

(Granted under Title 35, U. S. Code (1952), sec. 266)

The invention described herein may be manufactured and used by or for the Government for governmental purposes without payment to me of any royalty thereon.

This invention relates to the design and manufacture of recording heads of the multichannel type for use with magnetic tape.

In recording parallel binary code on multichannel magnetic tape, as is done for example in magnetic tape in formation storage devices for automatic digital computers, it is sometimes necessary to provide as many as seven channels on tape only one-half inch in width. In digital work it is desirable that the ratio of the width of each channel to the distance between adjacent channel centers be as great as possible in order to avoid errors due to small imperfections in the tape, and that the individual recording air gaps of the multichannel head be located in a straight line across the tape in order to avoid reading errors resulting from stretching of the tape. It is also desirable that the individual heads which make up the multichannel head be replaceable and that as much space as possible be provided for the windings in the individual heads.

It is accordingly the object of this invention to provide a multichannel head in which there are a relatively large number of recording air gaps for the width of the head, in which the air gap dimension transversely of the tape is large relative to the distance between centers of adjacent air gaps, in which the individual heads are identical and replaceable, in which the individual air gaps are in alignment, and in which the relatively large space is provided for the winding in each individual head.

It is a further object of the invention to provide a process or method of simply and accurately manufacturing an individual head which in assembly with other similar heads forms a multichannel head having the above-enumerated characteristics.

Figure 1:
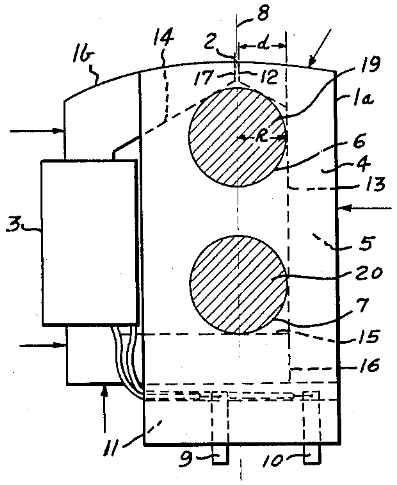
Figure 2:
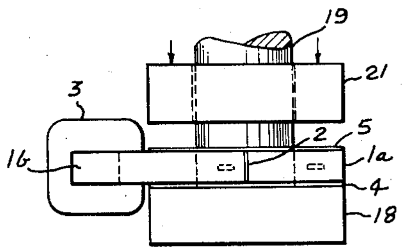
Figures 3, 3A:
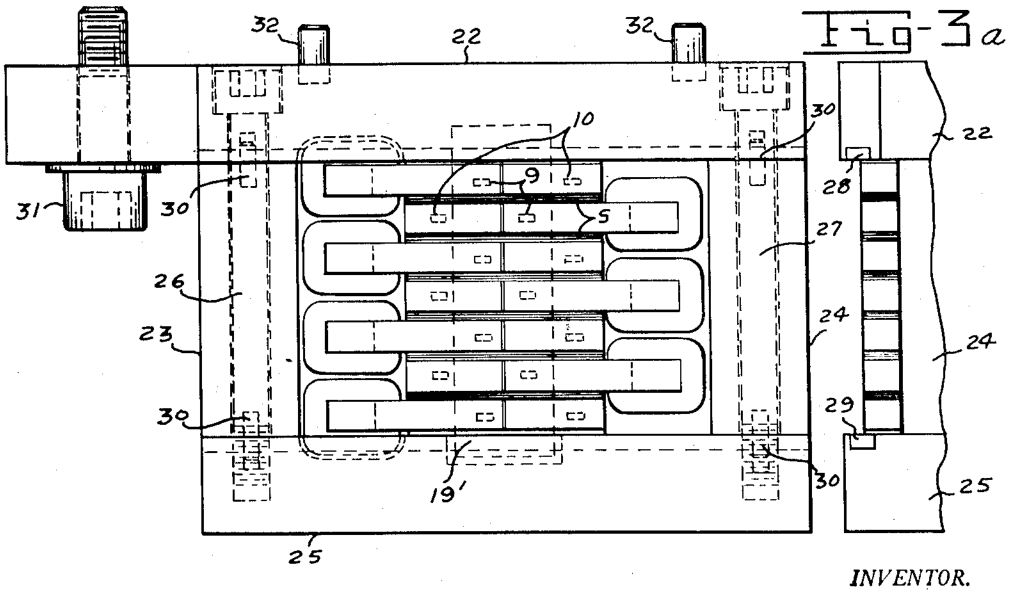

A more detailed description of the invention will be given in connection with the specific embodiment thereof shown in the accompanying drawings in which Figs. 1 and 2 illustrate the construction and method of manufacturing an individual head; and Figs. 3 and 3*a* illustrate a multichannel head made up of a plurality of the heads shown in Figs. 1 and 2 assembled in a suitable holder.

Referring to Figs. 1 and 2 the magnetic core of the individual head shown is made in two parts 1*a* and 1*b*, with a recording air gap at 2. Coil 3 is wound about section 1*b* of the core. The two sections of the core are held in their proper relative positions by identical thin plates 4 and 5, made of nonmagnetic material such as copper, and cemented to the core by a suitable metal-to-metal bonding agent of which there are a number readily available. Each of the plates is provided with circular openings 6 and 7 which are centered with respect to and spaced apart along a vertical axis 8 passing through the center of the air gap. These openings are utilized in the support and alignment of the individual head in the multichannel head as will be seen later. The plates

4 and 5 also extend below the core sufficiently to support a pair of blade contacts 9 and 10 embedded in a block of insulating material 11 which is cemented between the two plates in the same manner as the core sections. The two contacts are spaced differently from the vertical axis 8 for the purpose of staggering the contacts of adjacent heads in the multichannel head as will be shown later.

In manufacturing the individual heads the distance "*d*" between the right face 12 of the air gap and the inner face 13 of core section 1*a* is accurately controlled to be equal to $$R-\frac{G}{2}$$

where G is the air gap spacing and R is the radius of the openings 6 and 7. Also the surfaces 14, 15 and 16 of core section 1*b* are accurately controlled so that when these surfaces are tangential to openings 6 and 7 and in contact with surface 13 of section 1*a*, respectively, the left face 17 of the air gap is spaced by $G/2$ from the axis 8. The coil 3 is wound on core section 1*b* before assembly.

The individual head is assembled with the aid of a fixture also shown in Figs. 1 and 2. The fixture comprises a base plate 18 carrying two vertical aligning pins 19 and 20 spaced the same as openings 6 and 7 of plates 4 and 5 and having diameters such as to accurately fit these openings. After the inner surfaces of plates 4 and 5, both surfaces of core sections 1*a* and 1*b*, and both surfaces of contact block 11 have been coated with the bonding agent, plate 4 is placed over pins 19—20 and lowered to the base plate 18. Core sections 1*a* and 1*b* are next placed around pins 19—20 in the relative positions shown in Fig. 1 and their controllable surfaces brought into contact with each other or with pins 19—20 as the case may be as also shown in this figure. With block 11 in its proper place on plate 4, plate 5 is next placed over the pins and lowered into contact with the core and block 11. This is followed by pressure plate 21 of the fixture which has openings to receive pins 19—20. Then with pressure applied to the core sections in the directions of the arrows in Fig. 1 to maintain contact at the controlled surfaces, pressure is applied to plate 21 to carry out the bonding process. Heat may also be applied to plates 18 and 21 if required by the particular bonding agent used. It may be desirable to place a shim of air gap thickness between faces 12 and 17 during the bonding process to prevent closure of the air gap by the pressures applied to the core sections. This shim may be left in or later removed as desired. If left in place it must of course be made of a nonmagnetic material.

After the cementing of the head elements has been completed and while the head is still in the fixture the upper tape contacting surface is ground to a predetermined radius and height with respect to the aligning pins 19—20.

The manner of assembling a plurality of the above described individual heads into a multichannel recording head is shown in Figs. 3 and 3*a*. A holder is provided having a base plate 22, spacers 23 and 24 and an outer plate 25. The base plate carries two aligning pins 19' and 20' (not shown but beneath pin 19') which have exactly the same diameters and spacing as the pins 19 and 20 of the above described fixture. The head is assembled by placing the required number of individual heads over pins 19' and 20' with the coils of adjacent heads on opposite sides of the aligning pins. A magnetic shield "*s*" is placed between each pair of adjacent heads. The shield is identical to the plates 4 and 5, except that it need not extend beyond the bottom of the core, and is made of a highly permeable material such as Mumetal.

The spacers 23, 24 and outer plate 25 are then assembled and fastened by screws 26 and 27.

The outer ends of pins 19' and 20' and the coils of the end heads may be recessed into the base and outer plates as shown in Fig. 3. The base and outer plates extend slightly above the tape contacting core surfaces to act as guides for the tape and may be protected against wear from the tape by hardened inserts 28—29 as shown in Fig. 3*a*. Alignment of the various elements of the holder is insured by dowel pins 30, and the base plate 22 is provided with a screw 31 and dowel pins 32 for attachment to a panel. The holder including aligning pins 19' and 20' is made of a nonmagnetic material such as aluminum.

It is apparent that the described design permits a high ratio of channel or recording air gap width to the spacing between channel centers. For example, in the 7-channel head of Fig. 3, if the tape width is ½ inch and if plates 4, 5 and *s* are each .003 inch thick, each of the seven cores may have a thickness, or width transversely of the tape, of approximately .063 inch as compared with a spacing between core centers of .072 inch.

I claim:

1. A multichannel magnetic recording head comprising a main body having a pair of parallel aligning pins supported thereby; a plurality of identical individual recording heads each having a magnetic core with a recording air gap, a core supporting means attached to said core and having a pair of openings adapted to accurately fit said aligning pins, said openings being centered with respect to an axis passing through said gap, and a coil surrounding said core on one side of said axis and separated from said axis by an amount greater than the maximum extension of said core on the other side of said axis; said individual heads being stacked over said aligning pins with the coils of adjacent heads on opposite sides of said axis.

2. A multichannel magnetic recording head comprising a main body having a pair of parallel aligning pins supported thereby; a plurality of identical individual recording heads each having a closed magnetic core with a recording air gap, a core supporting means attached to said core and having a pair of openings within the inner boundary of said core adapted to accurately fit said aligning pins, said openings being centered with respect to an axis passing through said gap, and a coil surrounding said core on one side of said axis and separated from said axis by an amount greater than the maximum extension of said core on the other side of said axis; said individual heads being stacked over said aligning pins with the coils of adjacent heads on opposite sides of said axis.

3. Apparatus as claimed in claim 2 in which said core supporting means consists of a pair of relatively thin plates of nonmagnetic material cemented to opposite sides of said core.

4. Apparatus as claimed in claim 3 in which each of said individual heads has a pair of contacts connected to said coil, and means positioning said contacts on opposite sides of said axis and on the opposite side of said head from said air gap, one of said contacts being spaced substantially twice as far from said axis as the other contact whereby the contacts of adjacent individual heads are in staggered relationship.

5. Apparatus as claimed in claim 4 in which a thin sheet of highly permeable material, having openings adapted to accurately fit over said aligning pins, is situated between each of the adjacent individual heads.

6. A magnetic recording head having a closed magnetic core, said core being made in two parts which are in touching relationship at two ends and spaced apart at the other two ends to form a recording air gap, each of said core parts having nonparallel inner surfaces, a pair of nonmagnetic plates fastened to opposite sides of said core for supporting said core parts in fixed relationship, a pair of circular openings extending through said plates within the inner boundary of said core and centered on two axes normal to said plates and lying in a plane passing through said air gap, each of the cylindrical surfaces defined by oppositely disposed circular openings in said plates being tangent to at least one of the nonparallel inner surfaces of each core part, and a coil surrounding one part of said core on one side of said plane and having a minimum separation from said plane that is greater than the maximum extension of said core beyond said plane on the other side.

7. Apparatus as claimed in claim 6 in which said plates extend beyond said core on the side opposite said air gap, a block of insulating material fastened between said extended plates and supporting a pair of contacts on opposite sides of said plane, the separation of one contact from said plane being substantially twice that of the other contact and electrical connections between said coil and said contacts.

No references cited.